(12) United States Patent
Muramatsu et al.

(10) Patent No.: US 9,042,604 B2
(45) Date of Patent: *May 26, 2015

(54) ACQUISITION SCHEDULER

(71) Applicant: Hitachi, Ltd., Tokyo (JP)

(72) Inventors: Shoji Muramatsu, Hitachinaka (JP); Yuuji Otsuka, Hitachi (JP); Hiroshi Takenaga, Naka (JP); Tatsuhiko Monji, Hitachinaka (JP); Jiro Takezaki, Hitachinaka (JP); Isao Furusawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 106 days.

This patent is subject to a terminal disclaimer.

(21) Appl. No.: 13/871,003

(22) Filed: Apr. 26, 2013

(65) Prior Publication Data
US 2014/0078305 A1   Mar. 20, 2014

Related U.S. Application Data

(63) Continuation of application No. 13/358,596, filed on Jan. 26, 2012, now Pat. No. 8,452,056, which is a continuation of application No. 13/185,662, filed on Jul. 19, 2011, now Pat. No. 8,199,976, which is a (Continued)

(51) Int. Cl.
*G06K 9/00* (2006.01)
*H04N 7/18* (2006.01)
(Continued)

(52) U.S. Cl.
CPC .. *H04N 7/18* (2013.01); *B60R 1/00* (2013.01); *B60R 2300/105* (2013.01); *B60R 2300/108* (2013.01); *B60R 2300/207* (2013.01); *B60R 2300/301* (2013.01); *B60R 2300/302* (2013.01);
(Continued)

(58) Field of Classification Search
None
See application file for complete search history.

(56) References Cited

U.S. PATENT DOCUMENTS 6,314,364 B1   11/2001  Nakamura
2003/0189499 A1*  10/2003  Stricklin et al. ............... 340/933

FOREIGN PATENT DOCUMENTS

DE   42 21 280 A1   1/1994
EP   0 830 985 A1   3/1998
(Continued)

OTHER PUBLICATIONS
Japanese Office Action dated Apr. 1, 2008 w/English translation (three (3) pages).

(Continued)

*Primary Examiner* — Atiba O Fitzpatrick
(74) *Attorney, Agent, or Firm* — Crowell & Moring LLP

(57) ABSTRACT

An image pickup device that acquires images is controlled by an image pickup device controller that accepts image acquisition requests from multiple application programs, and an application scheduler selects application programs to be executed. Information indicative of the image data volumes and image data acquisition rates required for each of the multiple application programs is stored and used to select multiple concurrently executable application programs on the basis of the image data volumes and image data acquisition rates. An image acquisition scheduler determines the timing and intervals at which the multiple executable application programs repeat receiving image data from the image pickup device, without overlapping in terms of time. In addition, an operations section, which explicitly presents concurrently executable application programs to a user and commands the startup of these programs, is displayed on a navigation screen menu.

5 Claims, 16 Drawing Sheets

Related U.S. Application Data continuation of application No. 12/717,707, filed on Mar. 4, 2010, now Pat. No. 7,995,797, which is a continuation of application No. 10/563,486, filed as application No. PCT/JP03/08896 on Jul. 11, 2003, now Pat. No. 7,702,133.

(51) Int. Cl.
| | | |
|---|---|---|
| *B60R 1/00* | (2006.01) | |
| *G07C 5/08* | (2006.01) | |
| *H04N 5/232* | (2006.01) | |
| *G08G 1/14* | (2006.01) | |
| *G08G 1/16* | (2006.01) | |

(52) U.S. Cl.
CPC ....... *B60R 2300/70* (2013.01); *B60R 2300/804* (2013.01); *B60R 2300/806* (2013.01); *B60R 2300/8073* (2013.01); *B60R 2300/8093* (2013.01); *G07C 5/0866* (2013.01); *G07C 5/0891* (2013.01); *H04N 5/232* (2013.01); *H04N 5/23206* (2013.01); *H04N 5/23225* (2013.01); *H04N 7/181* (2013.01); *H04N 7/183* (2013.01); *G08G 1/14* (2013.01); *G08G 1/167* (2013.01)

(56) References Cited

FOREIGN PATENT DOCUMENTS

| | | |
|---|---|---|
| EP | 1 077 161 A2 | 2/2001 |
| JP | 5-207343 A | 8/1993 |
| JP | 06-295329 | 10/1994 |
| JP | 07-046568 | 2/1995 |
| JP | 08-240833 | 9/1996 |
| JP | 9-107498 A | 4/1997 |
| JP | 09-181962 | 7/1997 |
| JP | 2002-056381 | 2/2002 |
| JP | 2003-049703 | 2/2003 |
| JP | 2003-99547 A | 4/2003 |

OTHER PUBLICATIONS

Machine Translation for JPN 07 (1995)-046568 (Provided by Applicant in IDS).
Supplementary European Search Report dated Jun. 19, 2006 (four—4—pages).
Machine Translation for JPN 09-181962 (Provided by Examiner Aug. 20, 2010).
Machine Translation for JPN 07-046568 (Provided by Examiner Aug. 20, 2010).

* cited by examiner

FIG. 2

| APPLICATION | IMAGE QUALITY | RATE | CAMERA CONTROL | IMAGE PROCESSING FUNCTION |
|---|---|---|---|---|
| MONITORING | – | HIGH | FOR MONITORING | IMAGE DOWNSCALING AND EDGE ENHANCEMENT |
| DRIVE RECORDER | – | LOW | FOR MONITORING | IMAGE COMPRESSION AND DATA INTEGRATION |
| VIDEO ALBUM (HIGH IMAGE QUALITY) | HIGH | HIGH | FOR MONITORING | IMAGE COMPRESSION AND COLOR CORRECTION |
| VIDEO ALBUM (LOW IMAGE QUALITY) | LOW | LOW | FOR MONITORING | IMAGE COMPRESSION AND COLOR CORRECTION |
| AUTOMATIC LIGHT CONTROL | – | LOW | FAST/SLOW SHUTTERING AND COLOR CONTROL | MEASUREMENT OF EXTERNAL ILLUMINATION AND VEHICLE DETECTION |
| LANE DEVIATION ALARM | – | MEDIUM | FAST/SLOW SHUTTERING | LANE RECOGNITION |
| INTRUDING VEHICLE ALARM | – | MEDIUM | FAST/SLOW SHUTTERING AND COLOR CONTROL | LANE RECOGNITION AND VEHICLE DETECTION |
| PASSING VEHICLE ALARM | – | MEDIUM | FAST/SLOW SHUTTERING AND COLOR CONTROL | VEHICLE DETECTION |
| PARKING ASSISTANCE | – | LOW | FAST/SLOW SHUTTERING | OBSTACLE DETECTION AND PARKING-FRAME DETECTION |
| LANE KEEPING ASSISTANCE | – | MEDIUM | FAST/SLOW SHUTTERING | LANE RECOGNITION |
| COLLISION ALLEVIATION | – | HIGH | OPTIMUM SHUTTERING | DETECTION OF VEHICLES AND OBSTACLES |
| COLLISION AVOIDANCE | – | HIGH | OPTIMUM SHUTTERING | LANE RECOGNITION AND DETECTION OF VEHICLES AND OBSTACLES |

(-: NOT DEFINED)

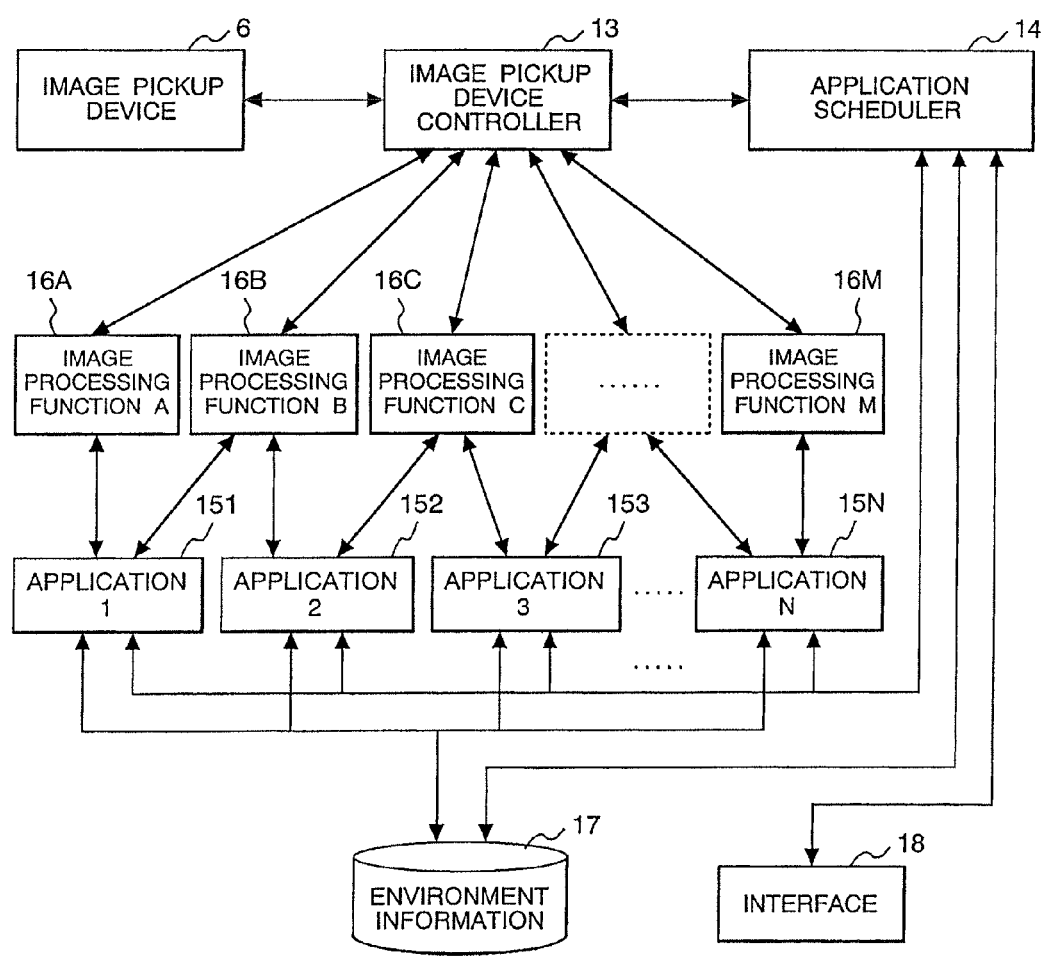

FIG. 11
GROUP 1:
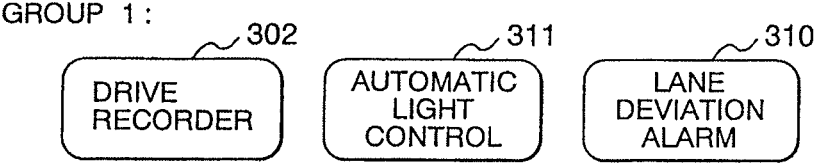
- 302 DRIVE RECORDER
- 311 AUTOMATIC LIGHT CONTROL
- 310 LANE DEVIATION ALARM
GROUP 2:
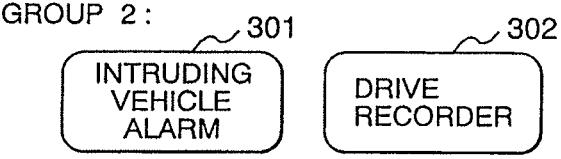
- 301 INTRUDING VEHICLE ALARM
- 302 DRIVE RECORDER
GROUP 3:
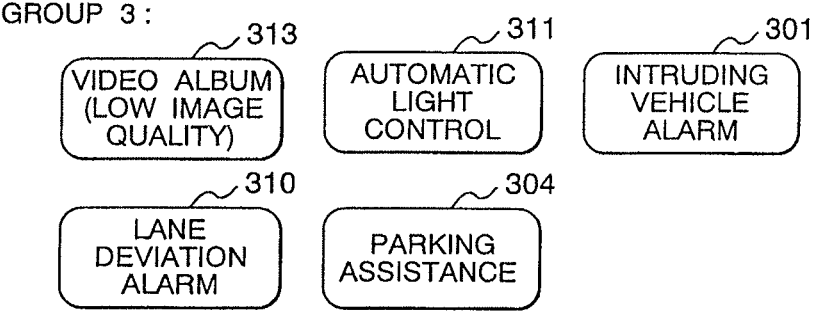
- 313 VIDEO ALBUM (LOW IMAGE QUALITY)
- 311 AUTOMATIC LIGHT CONTROL
- 301 INTRUDING VEHICLE ALARM
- 310 LANE DEVIATION ALARM
- 304 PARKING ASSISTANCE
GROUP 4:
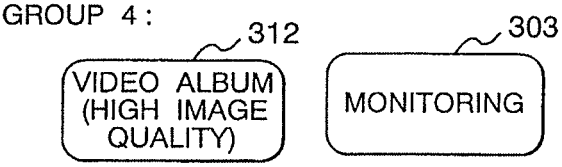
- 312 VIDEO ALBUM (HIGH IMAGE QUALITY)
- 303 MONITORING

ACQUISITION SCHEDULER

CROSS-REFERENCE TO RELATED APPLICATIONS

This application is a continuation of and claims priority to U.S. patent application Ser. No. 13/358,596, filed Jan. 26, 2012, the disclosure of which is incorporated herein in its entirety and which is a continuation of U.S. patent application Ser. No. 13/185,662, filed Jul. 19, 2011, now U.S. Pat. No. 8,199,976, issued Jun. 12, 2012, the priority of which is claimed which is a continuation of U.S. patent application Ser. No. 12/717,707, filed Mar. 4, 2010, now U.S. Pat. No. 7,995,797, issued Aug. 9, 2011, the priority of which is claimed, which in turn is a continuation of U.S. patent application Ser. No. 10/563,486, now U.S. Pat. No. 7,702,133, issued Apr. 20, 2010, the priority of which is claimed, which, on Jan. 5, 2006, entered the U.S. national stage of International Application No. PCT/JP2003/008896, filed Jul. 11, 2003, the priority of which is claimed.

FIELD OF THE INVENTION

The present invention relates to an image-processing camera system sharing one image pickup device for multiple purposes, and to a method of controlling the camera system.

BACKGROUND OF THE INVENTION

Image-processing technology has already begun to be applied to surveillance systems intended to detect the intrusion of unwanted persons and/or the occurrence of unusual events, and to vehicle-mounted systems for assisting safety driving of vehicles. For outdoor image-processing systems such as vehicle-mounted systems, camera control matching a particular external environment is needed to acquire necessary images from one image pickup device into multiple application programs. Even for a single application program, the need arises for a user to control the direction and exposure of the camera according to the desired viewing place and/or the desired operating time zone. For example, in the camera system mounted in an automobile to recognize lanes, the brightness of the images obtained will abruptly change according to the particular environmental conditions. For example, the object to be photographed may be present at the entrance/exit of a tunnel, exposed to the sunlight in the late afternoon, or exposed to the headlight(s) of an oncoming vehicle. Even in such cases, the camera system must recognize lanes stably with one camera installed in a forward direction. Exposure control techniques for acquiring stably the images that an application program requires are disclosed in, for example, Japanese Patent Laid-Open No. Hei 8 (1996)-240833 and Japanese Patent Laid-Open No. Hei 9 (1997)-181962.

To proliferate the application of image-processing technology to these systems, image-processing apparatus is required to be reduced in installation space requirements and in price. The techniques exist that each share one image pickup device between multiple application programs in order to achieve such space requirement reduction and price reduction. An example of such a technique is, as disclosed in Japanese Patent Laid-Open No. Hei 7 (1995)-46568, enables multiple application programs to use one camera efficiently. More specifically, multiple application programs share one camera when sharable images can be acquired using the same camera control parameters (exposure, viewing angle, and camera direction) that the multiple application programs require. One camera is also shared under the conditions that any differences in each of the above camera control parameters stay within a required range and that time-division control is possible by modifying data settings within a very short time during which the images in the multiple application programs are not interrupted. If any differences in each of the above parameters overstep the required range, the corresponding application programs will be notified of the fact that photographing is impossible, and appropriate processing will be executed at the corresponding application program side.

SUMMARY OF THE INVENTION

Application programs for use in the surveillance system or vehicle-mounted system required to process images at a predetermined cycle time will now be assumed. Examples of vehicle-mounted systems include a lane-keeping system that recognizes the driving lane of the vehicle by image processing and then controls steering to prevent the vehicle from deviating from the driving lane. In this system, lane recognition results based on image processing must be acquired within a fixed time (say, within 200 ms) to control steering. In such a system that uses image-processing results in subsequent control, the processing cycle of image processing must be absolutely observed. If this cycle is not strictly observed, system operation will not be allowable since control that uses image processing will be impossible and thus since the system itself will not operate properly and result in malfunction or other unusual states. Examples of the systems required to be highly reliable in this perspective include surveillance systems such as an intruder detection system, a human traffic/vehicle traffic measuring system, and an abnormality detection system. Also, there are a large number of types of vehicle-mounted systems such as safety assistance systems and various alarm systems. For the camera used in such a surveillance system or a vehicle-mounted system, since there is a need to recognize an external environment, camera parameters constantly change, even in one application program. Therefore, the camera cannot be made sharable by the approximation of the camera parameters existing at a particular point of time. For example, in the above-mentioned lane-keeping system, if the camera parameters existing at a certain point of time become approximate to those of another application program by chance, the approximation will operate the system. The next moment, however, the camera parameters will change, which will make the camera non-sharable and stop the lane-keeping system. These situations must not occur in the system used for control. Otherwise, a reliable system will not be obtainable.

An object of the present invention is to provide an image-processing camera system capable of sharing, with high reliability, one image pickup device between multiple application programs.

Another object of the present invention is to provide a very-easy-to-use image-processing camera system that explicitly displays multiple executable application programs to a user and enables the user to select desired application programs without hesitation.

The present invention includes, in one aspect thereof, image pickup means for acquiring images, an image pickup device controller for accepting an image acquisition request from a plurality of application programs and controlling an image pickup device, and an application scheduler that selects application programs to be executed. The application scheduler has means for selecting a plurality of concurrently executable application programs on the basis of the image data volumes and processing rates read out from means which stores necessary volumes of image data and processing rates in the plurality of application programs. The application scheduler also has an image acquisition scheduler that determines image data acquisition timing and intervals at which the plurality of executable application programs are to repeat acquiring image data from one image pickup device without overlapping in terms of time.

This makes highly reliable sharing of one image pickup device among the plural application programs that dynamically vary camera parameters.

The present invention includes, in another aspect thereof, means for displaying a plurality of concurrently executable application programs, and operations means intended for a user to specify startup of the displayed executable application programs.

This makes it possible to provide a very-easy-to-use image-processing camera system that explicitly displays plural executable application programs to the user and enables the user to select desired application programs without hesitation.

Other objects, features, and characteristics of the present invention will become apparent from the following description of embodiments when reference is made to the accompanying drawings, in which:

BRIEF DESCRIPTION OF THE DRAWINGS

FIG. 2 is a diagram that lists the image quality levels, processing rates, and camera control and image-processing function types that a large number of application programs require in the automobile;

FIG. 3 is a functional block diagram of the image-processing camera system in an embodiment of the present invention;

FIG. 11 is a diagram showing an example of grouping concurrently operable application programs;

DESCRIPTION OF THE PREFERRED EMBODIMENTS

Figure 1A:
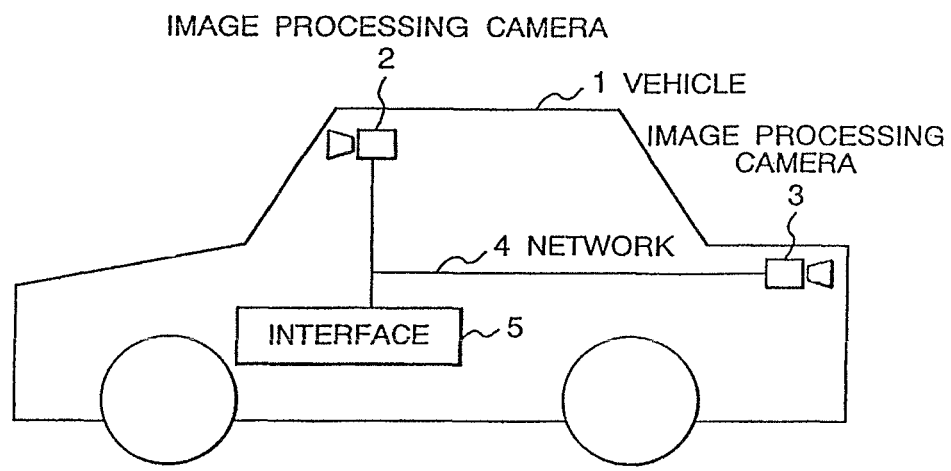
FIG. 1A shows a block diagram of an image-processing camera system in an embodiment of the present invention applied to an automobile.
Figure 1B:
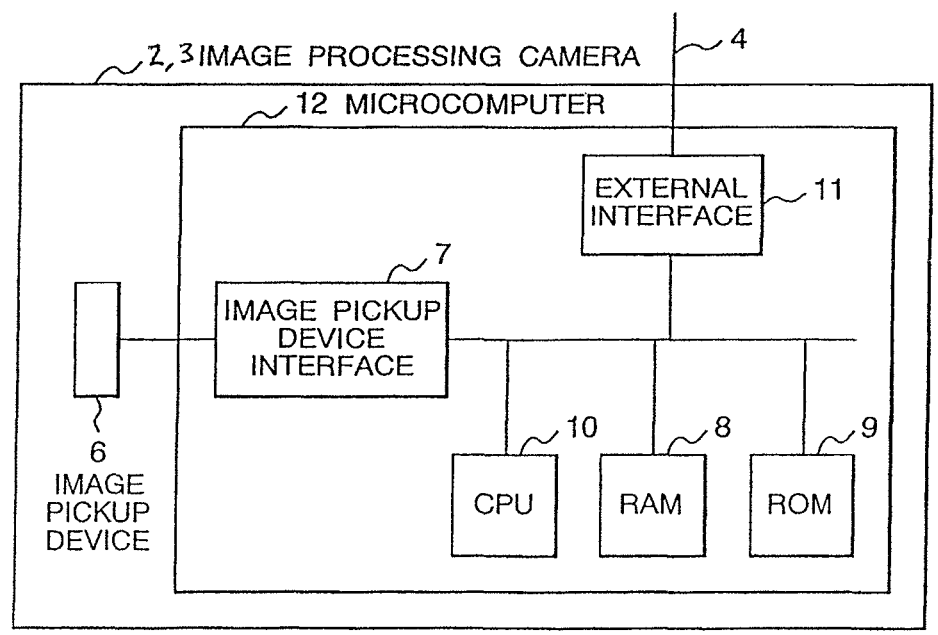
FIG. 1B shows a hardware configuration diagram of an image-processing camera.

FIG. 1A shows a schematic block diagram of an automobile-mounted image-processing camera system in an embodiment of the present invention, and FIG. 1B shows a hardware configuration diagram of an image-processing camera. This image-processing camera system realizes such a large number of application programs as described later herein, by using cameras 2, 3 installed in a forward direction and backward direction of an automobile 1. The image-processing cameras 2, 3 are connected to an interface element 5 via a network 4. For the automobile 1, the network 4 can be, for example, a standardized network such as a control area network (CAN), or an access method that only expresses ON/OFF states with a mere electric power line, or any other appropriate form of access. The interface element 5 is a navigation system, a steering wheel, a brake, or any other device that exchanges information with a driver, or is an engine control unit, a global positioning system (GPS), a sensor, or any other device that exchanges information with a control device. If the interface element 5 is a navigation system, the element 5 transmits a large volume of information through the network 4 such as a CAN. If the interface element 5 is a side brake or any other device, the element 5 transmits only the minimum ON/OFF state information required.

An embodiment of a hardware configuration of the image-processing cameras 2, 3, will now be described using FIG. 1B. An image that has been acquired by an image pickup device 6 is stored into a RAM 8 via an image pickup device interface 7. The large number of application programs described later herein, a control program for the image pickup device 6, and other programs are prestored within a ROM 9 and executed by a CPU 10 as required. Inside the image-processing cameras 2, 3, an external interface element 11 functions as a mediator with respect to an external device via the network 4. That is to say, the elements 7 to 11 constitute a microcomputer 12, and the ROM 9 contains information on programs for starting up the image-processing cameras 2, 3, and on executable application programs. Also, the RAM 8 contains the information required for execution of application programs. The types of information required for the execution of application programs include, for example, the environment information described later herein, information obtained from the interface element 5 of FIG. 1A, and image data. The image pickup device 6 is controlled by the program that the microcomputer 12, namely, the CPU 10 is to process, and associated control information is transmitted via the image pickup device interface 7.

FIG. 2 is an explanatory diagram of the large number of application programs in the automobile, the image quality levels required, processing rates, camera control functions, and image-processing functions. As shown in FIG. 2, examples of application programs include the following: (1) monitoring around the vehicle, (2) a drive recorder that records a driving status, (3) a video album function that records driving ambient images as a memorial, (4) a lane deviation alarm function realized by recognizing a driving lane by means of a camera, (5) an obstacle alarm function that issues alarms against obstacles to driving, (6) intruding/passing vehicle alarms, (7) an automatic light control function that controls deactivation of lights automatically and controls brightness levels and beam-emitting directions of the lights, (8) parking assistance and lane-changing assistance functions for parking and lane changing, (9) collision alleviation and avoidance functions that minimize collision damage before a collision occurs, or avoids the collision itself, and so on.

The four items, (1) Image quality, (2) Rate, (3) Camera control, and (4) Image-processing functions, that the large number of application programs require will be described below.

First, for item "(1) Image quality", although higher image quality is desirable, an increase in resolution increases a data volume and applies a heavier processing load, which may result in processing at a required rate becoming impossible. Image quality suited for a particular application program exists for these reasons. Although the image quality that uses only a video album is specified in FIG. 2, image quality appropriate for other application programs also exists, similarly to the video album. For example, the image quality required for lane recognition needs only to be of a level at which a white line or other lane markers can be discriminated, and images of quality higher than that actually required does not need to be acquired by consuming time and memory space.

Next, for item "(2) Rate", similarly to image quality, a rate appropriate for the particular application program also exists. The rate here refers to frequency of processing. A higher rate means a smaller number of processing cycles, and processing is repeated at shorter time intervals. In general, to acquire high-quality images or to conduct control relating to safety, image acquisition at short intervals is required and the rate is increased. For example, in the application program required to be highly reliable and rapidly responsive for collision alleviation, collision avoidance, or other purposes, the number of image-processing operations needs to be increased for improved reliability and responsiveness. For these reasons, some application programs satisfy their functional requirements if the application program can execute processing once per second, and some require processing at intervals of 16 milliseconds. The rate must therefore be considered to share an image pickup device.

The application programs required for item "(3) Camera control" can be divided into those mainly used for human beings to view images, and those used for a computer to process images. The monitoring, drive recorder, and video album functions listed in FIG. 2 are application programs intended for viewing, and the automatic light control and other application programs listed thereunder in FIG. 2 are intended for recognition processing. Camera control for monitoring needs only to be such that images natural to the human eye can be acquired, and camera control for image processing is conducted so as to enable acquisition of such images that sections to be processed are actually processable. Images that were acquired by slow shuttering to process dark image portions, and images that were acquired by fast shuttering to process bright image portions exist as images to undergo image processing. These images acquired under shutter control usually differ from those acquired under monitoring-camera control, since the images may be visually too dark or too bright. Images by color control also differ from those of monitoring-camera control intended to reproduce natural colors, since color control is used to acquire images with emphasis placed on red and yellow colors in order to detect signals.

Finally, item "(4) Image-processing functions" required for each type of application program are listed in FIG. 2. Basic image-processing functions include image compression, color correction, lane recognition, vehicle detection, and others. Some of these functions are each required to be the same for multiple application programs. If the same function is actually required for multiple application programs, camera control that requires the function is considered to be sharable between the application programs. For example, a lane recognition function is required for a lane deviation alarm, and if an intruding vehicle alarm likewise requiring the lane recognition function, and the lane recognition function can be shared, this also enables common use of an image pickup device.

An embodiment of the present invention that implements use of a large number of application programs by sharing one camera (image pickup device) will be described below.

FIG. 3 is a functional block diagram outlining an embodiment of an image-processing system according to the present invention. Most of the functions shown in FIG. 3 are executed by the microcomputer 12 shown in FIG. 1B. First, the image-processing system includes an image pickup device controller 13 that controls an image pickup device 6 intended to acquire images, and an application scheduler 14 that controls execution and shutdown of application programs. This system has an N number of application programs, 151 to 15N, and each of the application programs operates by using only necessary ones of basic image-processing functions (A to M), 16A to 16M. The image-processing system also has environment information 17 that each application program is to use for processing and that the application scheduler 14 is to use for controlling the application program. In the present embodiment, in addition to the image pickup device 6 usually called the camera, an image device controller 13 that controls the image pickup device 6, and a section that executes the various application programs A to M are integrated into the image-processing cameras 2, 3 shown in FIG. 1A. For this reason, the cameras (e.g., cameras 2, 3) that have functions such as advanced processing functions to realize the above-mentioned application programs, are called the image-processing cameras in order to distinguish these cameras from the camera used merely to acquire images.

Independent execution of an application program 151, one of the application programs 1 to N shown in FIG. 3, is described first. The information contained in the description of independent execution is the same as the operational information contained in, for example, Japanese Patent Laid-Open No. Hei 8 (1996)-240833 and Hei 9 (1996)-181962 relating to conventional techniques. In order to acquire from the image pickup device 6 the image required for processing, the application program 151 refers to the environment information 17 that is information relating to brightness of surroundings, an image-processing range, a currently acquired image state, and other factors. The application program 151 determines camera parameters (camera direction, diaphragm value, shutter speed, and the like) from the environment information 17, and requests the image pickup device controller 13 to control the image pickup device 6. Considering factors such as exposure timing of the image pickup device 6, the image pickup device controller 13 sets up the camera parameters that the application program 151 wants. More specifically, the environment information 17 here includes map information, dates (seasons), vehicle exterior illuminance, weather, a watching range, and other factors.

When only an independent application program exists as above, it suffices just to provide a function necessary for the image pickup device controller 13 to set up in the image pickup device 6 the camera parameters that the application program wants. Since the number of application programs in FIG. 3 is plural, however, it becomes necessary to provide the functions that accept the camera parameters requested from each application program and conduct control so that the image pickup device 6 can acquire respective images at limited time intervals. In the present embodiment, the application scheduler 14 performs the functions. In other words, the application scheduler 14 has the functions that adjust and executes the control requested from the plural application programs 1-N to the image pickup device 6.

Depending on the kinds of application programs to be used, the image pickup device 6 may not be sharable. For example, this case applies when, whereas one application program is intended to acquire finer/sharper images on a frame-by-frame basis for higher-quality image recording, another application program is intended to acquire, at time intervals as short as possible and each time whenever necessary, the images required for image processing for purposes such as avoiding a collision. Executing the two application programs concurrently using one image pickup device is difficult unless the type of camera control for the application programs is exactly the same. The kinds/operation of application programs to be concurrently executed are therefore limited, but the control in this case is also undertaken by the application scheduler 14. The application scheduler 14 judges the kinds of executable application programs from the image control information and throughput that each application program needs, and from a driving status of the automobile 1. Acquisition timing and processing timing of the images are adjusted when the particular application program is judged to be executable. One image pickup device can be efficiently shared, even between the plural application programs for which the application scheduler 14 dynamically varies the camera parameters. As shown in FIG. 1A, an interface element 5 functions as a mediator such as a navigation system, steering wheel, or brake, with respect to a driver or a driving control system for the automobile 1.

Next, camera parameter control of an image pickup device 1 will be described using FIGS. 4 and 5.

Figure 4:
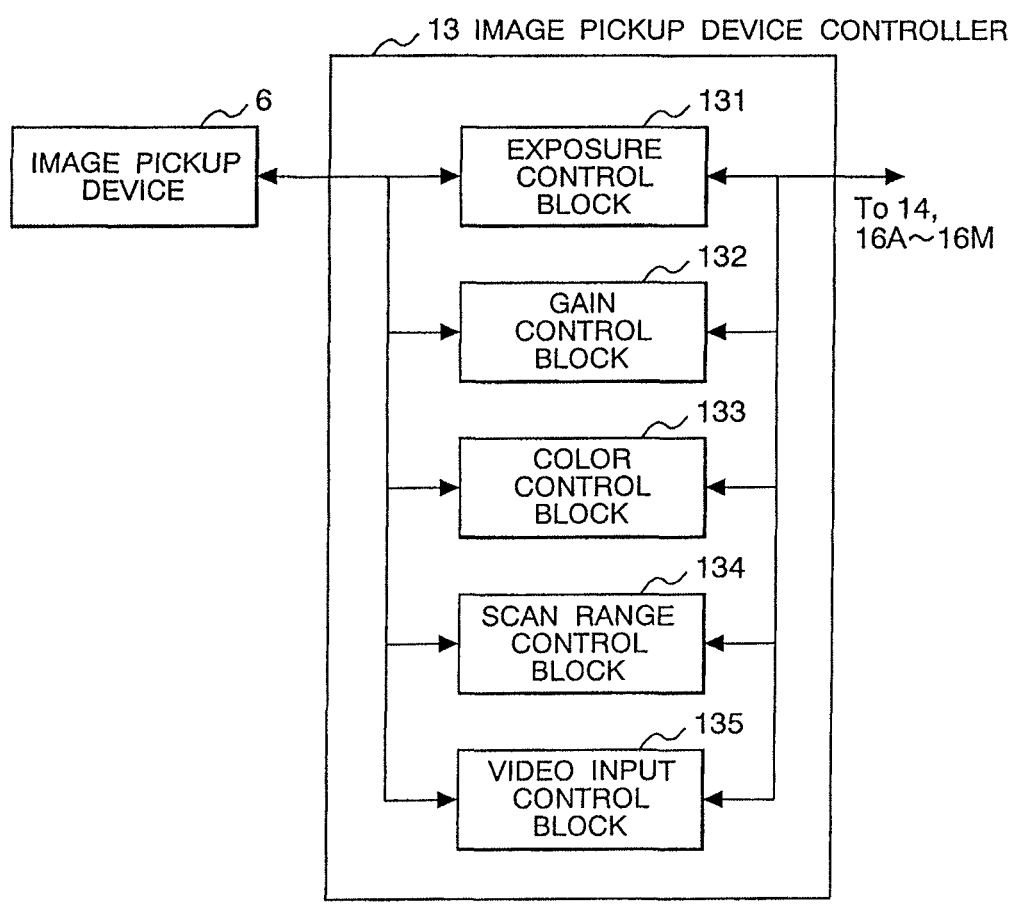
FIG. 4 is a functional block diagram of an image pickup device controller.

FIG. 4 is a functional block diagram of the image pickup device controller 13. Five control function blocks exist to control an image obtained from the image pickup device 6. First, there are an exposure control block 131 that controls the amount of light incident on an image pickup element provided to convert the amount of light into an electrical signal, a gain control block 132 that controls brightness using the electrical signal obtained by the above conversion, and a color control block 133 that controls color information. Next, there are a scan range control block 134 that limits a data transfer range and scans a screen at high speed, and a video input control block 135. Each of the five control blocks is executed during program processing by a microcomputer 12, as shown in FIG. 1B. Depending on a particular object of control, some static parameters can be modified in real time and some dynamic parameters require modification by mechanical control of an associated device. In the latter case, acquiring a desired image may be a time-consuming task.

Figure 5:
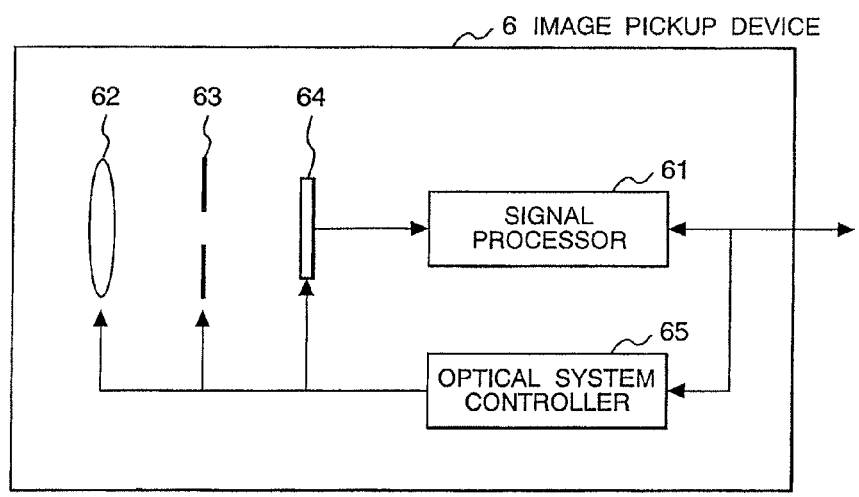
FIG. 5 is a hardware configuration diagram of an image pickup device.

FIG. 5 is a hardware configuration diagram of the image pickup device 6. The image pickup device 6 uses a signal processor 61 to internally execute gain control, color control, and other static control functions that enable camera parameter modification. In the meantime, however, an optical system controller 65 that dynamically controls focus and shutter speed is disposed in an optical system that includes a lens 62, a diaphragm 63, an image pickup element 64, and other elements. In the present embodiment, scheduling for modification of these parameters is also executed and as mentioned above, while parameters on signal processing can be instantaneously modified, instantaneous modification of parameters on the optical system is usually not possible.

Methods of scheduling are described next. As mentioned above, each application program requires processing at a required rate. For example, when a lane deviation alarm is to be issued within 300 [ms] of a start of lane deviation, a processing cycle of a lane deviation alarm process must be 300 [ms] or less, even at the longest. If a particular relationship with an ongoing application program does not permit the required rate to be achieved, the lane deviation alarm process should not be started. Accordingly, it is necessary that scheduling be conducted so as to make the required rate achievable, and that each application program be started. Scheduling is detailed below.

Figure 6:
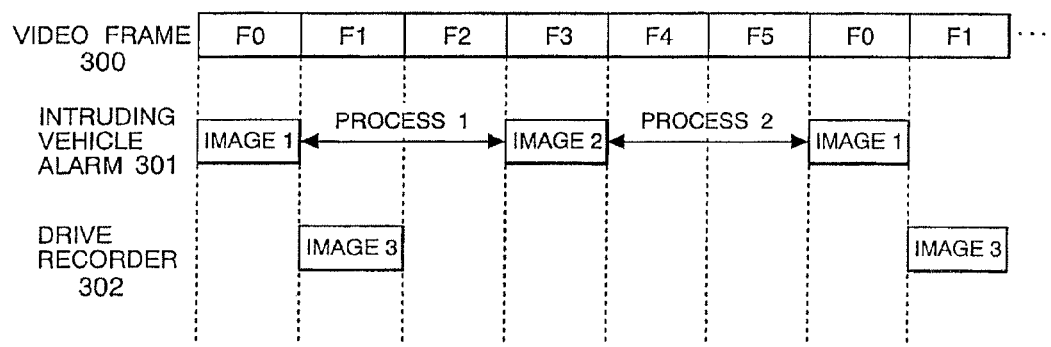
FIG. 6 is a timing chart showing an example of operational scheduling of plural application programs.

FIG. 6 is a timing chart showing an example of operational scheduling of plural application programs. More specifically, this timing chart applies to an example in which an intruding-vehicle alarm application program and a drive recorder application program are scheduled to be concurrently executed sharing one image pickup device. A video frame 300 defines timing at which images can be acquired, and the acquisition timing of each image is expressed by a frame number of frame F0-F5. For instance, for a normal type of image pickup device, one frame is 33 [ms] or 16 [ms] long. For an intruding vehicle alarm 301, as listed under a column of "Camera control" in FIG. 2, two images based on fast shuttering control and slow shuttering control are used to conduct a intruding vehicle recognition (detection) process. For this reason, images 1, 2 need to be acquired for processing. In FIG. 6, since a processing cycle of the lane deviation alarm 301 is 6 frames long (per cycle), two images are acquired and processed within a period of six frames. At the same time, although a driver recorder 302 is an image recording process, a processing cycle of this process is also 6 frames long and one image is acquired within this frame period. The application scheduler 14 in FIG. 3 acquires the images 1, 2 for the intruding vehicle alarm 301 and calculates a processing time for processes 1, 2. Six frames are required for the intruding vehicle alarm 301. Therefore, the image 1 is acquired into a frame F0, the process 1 is assigned to frames F1, F2, the image 2 is acquired into a frame F3, and the process 1 is assigned to frames F4, F5. However, the drive recorder 302 conducts only an image acquisition process, so for the intruding vehicle alarm 301, acquisition of an image 3 is assigned to frame F1 not using the image pickup device 6. In this case, since the image acquisition timing differs between both application programs, it is possible to set up totally different camera parameters for the images 1 to 3 and thus to share one image pickup device between the two application programs.

Figure 7:
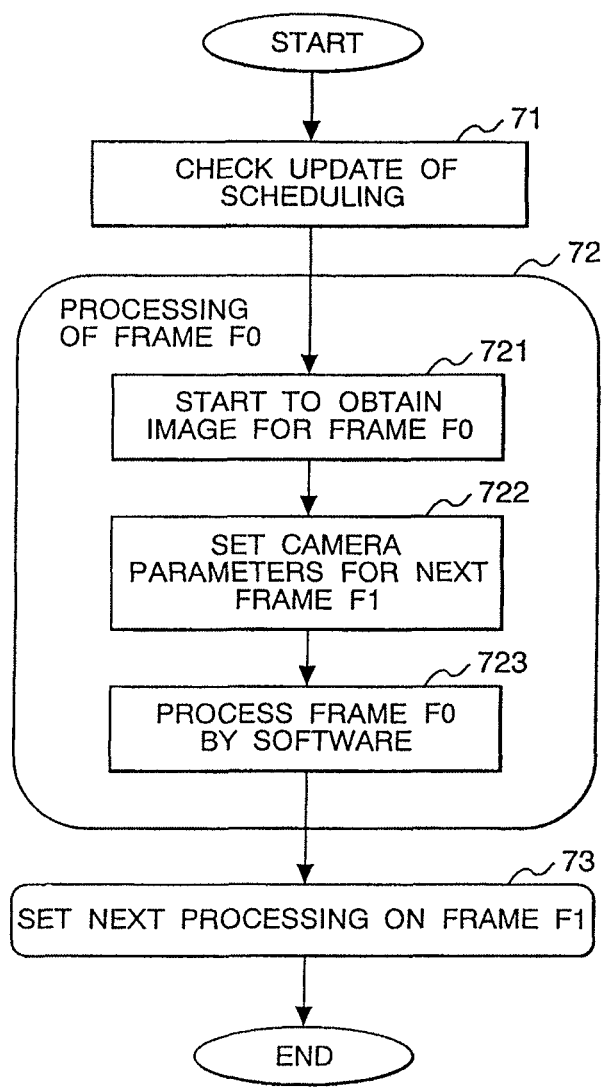
FIG. 7 is a process flow diagram of scheduling an application program in an embodiment of the present invention.

FIG. 7 is a process flow diagram of application scheduling in an embodiment of the present invention. A scheduling cycle will be described using the flow diagram. In above-mentioned FIG. 6, the processing cycle is six frames long (frames F0 to F5), and this processing cycle is repeated. First, whether an ongoing processing schedule has been updated is confirmed in step 71 of the processing cycle periodically repeated. If the schedule has not been changed, control progresses to step 72 for a process associated with a period of the frame F0. In step 72, step 721 is first executed to issue an acquisition command on image data to be acquired within the period of the frame F0. Image data acquisition is implemented using a transfer method, usually called DMA transfer, that does not load the CPU. Therefore, CPU processing advances to next step 722. In step 722, camera parameters to be acquired during the period of the next frame F1, for example, shutter speed and other exposure control parameters are set up. Setup of the camera parameters is executed as a function of the image pickup device controller 13 of FIG. 3 by the microcomputer shown in FIG. 1B. That is to say, the camera parameters are set up at timing appropriate for the image pickup device 6, via the image pickup device interface 7. When this process is completed, control progresses to step 723. Software processing to be executed in the period of the frame F0 is conducted in step 723. After execution of all processes to be conducted in the F0 frame period, step 73 is executed to set up data so as to conduct processing in the frame F1 next time, and current processing is completed. After this, when the time of the frame F1 comes and current processing is restarted by a timer interruption event, processing in the frame F1 will be executed in a like manner. In this way, processing in the frames F0 to F5 will be sequentially repeated with each timer interruption event.

Even if, in step 71, the schedule is judged to have been updated, although the kind of subsequent processing is the same as that described above, the processing timing for each frame is initialized, as required, in accordance with a new schedule. The new schedule is executed in step 71.

Figure 8A:
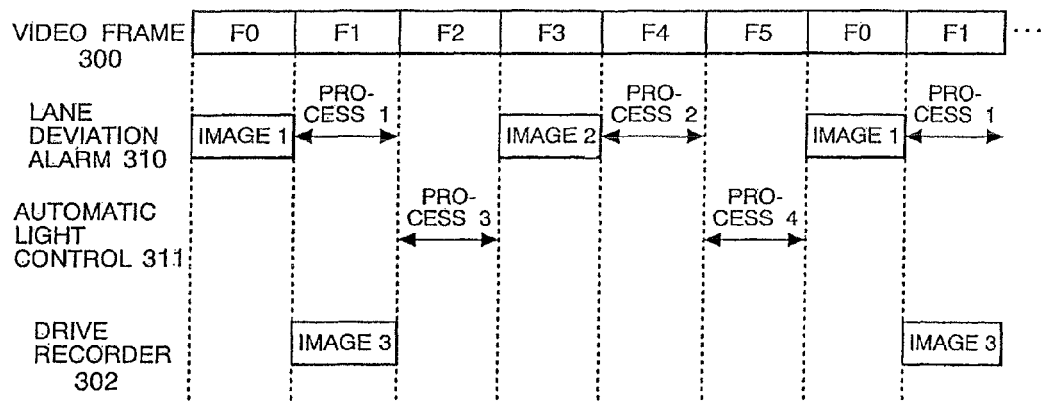
FIGS. 8A and 8B show timing charts of other examples of operational scheduling of plural application programs.
Figure 8B:
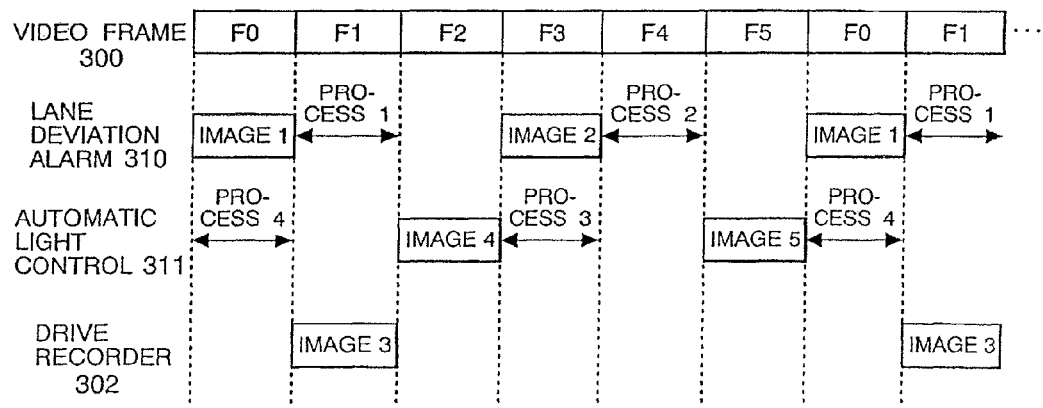

FIGS. 8A and 8B show timing charts of other examples of operational scheduling of plural application programs, and these timing charts are explanatory diagrams of concurrent operation of lane deviation alarm 310, automatic light control 311, and drive recorder 302. The lane deviation alarm 310 uses a processing cycle of six frames, requires two images, one based on the control of fast shuttering and the other based on the control of slow shuttering, and has a throughput of two frames, one for each image. Automatic light control 311 also uses a processing cycle of six frames, requires two images, one based on the control of fast shuttering and the other based on the control of slow shuttering, and has a throughput of two frames, one for each image. The drive recorder 302 needs only to record one image for each fixed interval (in this example, every six frames). Scheduling for application program execution in this case is shown in FIGS. 8A and 8B. FIG. 8A shows a case in which the images 1, 2 that apply the fast/slow shuttering functions to be used for the lane deviation alarm 310 can be shared with the images that are to be used for automatic light control 311. Assume that at this time, the same camera control is used for the image-processing functions of vehicle detection and lane recognition. Since the same image can be used for the lane deviation alarm 310 and automatic light control 311, process 1 for the lane deviation alarm 310 and process 3 for automatic light control 311 are executed for the image 1, and processes 2 and 4 are executed for the image 2. As a result, such scheduling as shown in FIG. 8A can be executed by the function of the application scheduler 14 of FIG. 3, and therefore, three application programs can share one image pickup device 6.

An example in which the lane deviation alarm 310 and automatic light control 311 cannot share images associated with these functions is described below using FIG. 8B. This example assumes that respective application programs use different camera parameters and thus that the same control is not always conducted. Since the lane deviation alarm 310 and automatic light control 311 cannot share the respective images, automatic light control 311 needs to acquire images 4 and 5 at its own. The images 4, 5 that neither the lane deviation alarm 310 nor automatic light control 311 is using are scheduled to be acquired in the frames F2, F5, respectively. Processes 3, 4 for automatic light control 311 are scheduled in frames F0, F3, respectively, in line with the image acquisition timing. This makes it possible to concurrently operate the three application programs while each thereof is sharing one image pickup device 6.

Figure 9A:
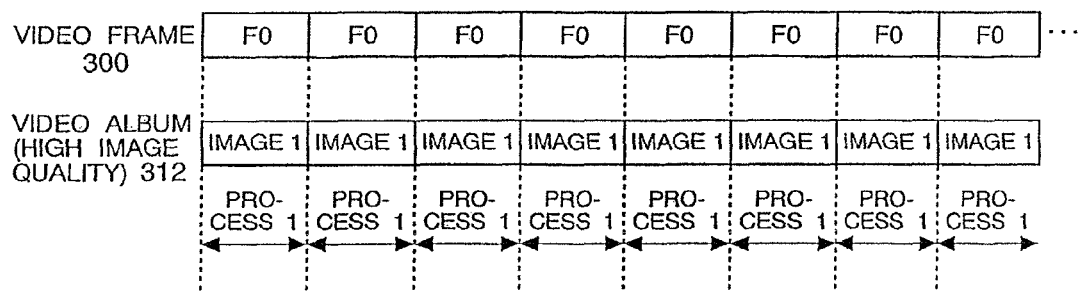
FIGS. 9A and 9B show timing charts of scheduling for operating a video album application program.
Figure 9B:
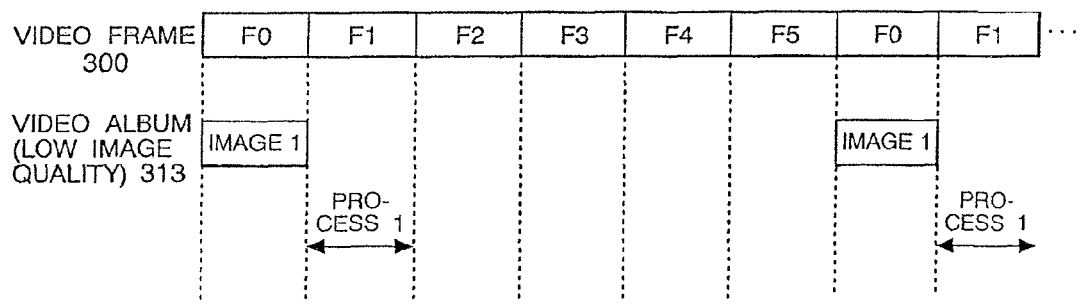

FIGS. 9A and 9B show timing charts of scheduling for operating the video album application program. In high-image-quality mode 31 of the video album, it is required to acquire an image for each frame and compress the image in real time. Since an image is acquired for each frame, the processing cycle is one frame long, as shown in FIG. 9A. In a low-image-quality mode 313 of the video album, there is no need to record an image for each frame, so some image frames skip. If the processing cycle at this time is six frames long, such scheduling as shown in FIG. 9B will occur. As can be seen from this figure, executing the high-image-quality video album function provides no room for operation of an application program which uses the image pickup device 6. Thus, concurrent execution only with an application program, such as the drive recorder 302, that can share images with high-image-quality video album 312, becomes possible as a result.

Conversely, the low-image-quality video album function enables various application programs to be selectively executed since new other camera parameter settings can be used to control the image pickup device 6 and acquire images.

Figure 10A:
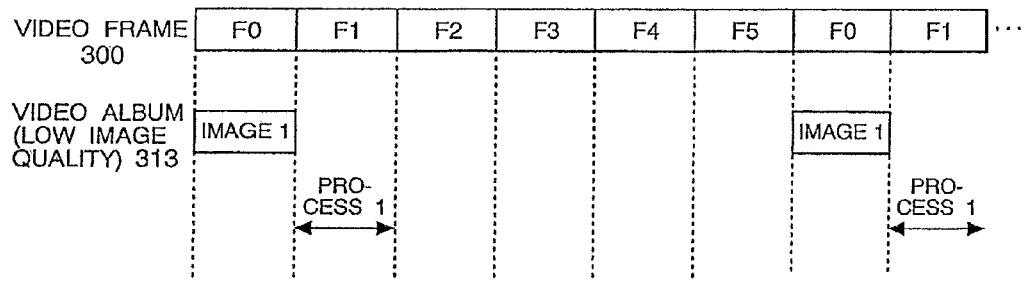
FIGS. 10A and 10B show timing charts of procedure scheduling for additionally starting up an application program.
Figure 10B:
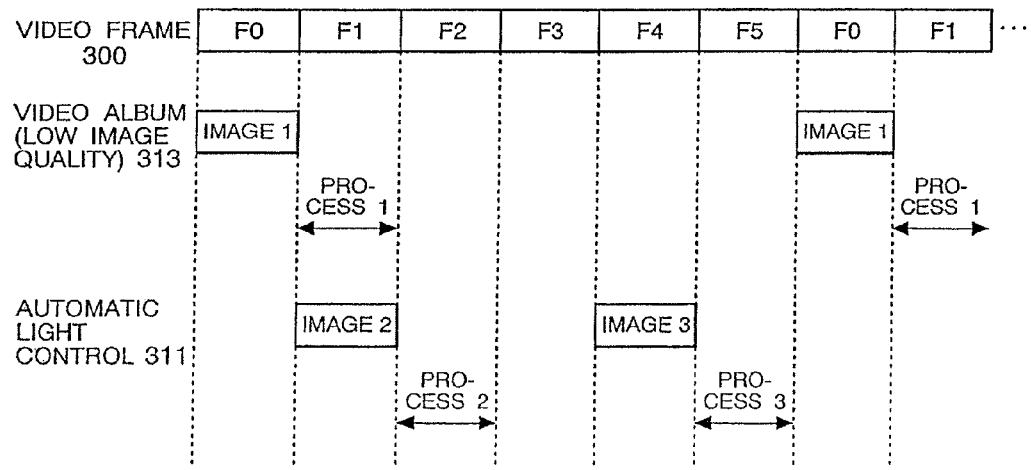

FIGS. 10A and 10B show timing charts of procedure scheduling for additionally starting up an application program, and these timing charts are explanatory diagrams of starting up automatic light control 311 additionally during operation of low-image-quality video album 313. In FIG. 10A, only the low-image-quality video album 313 is in operation and so the image pickup device 6 is also idle during most of the time period. In this case, when automatic light control 311 is added, since its shortest processing cycle is four frames long (two image acquisition operations and two image-processing operations), this frame period stays within the six-frame processing cycle of the video album function 313. Also, if this cycle is four frames or longer, the low-image-quality video album 313 and automatic light control 311 can be executed concurrently. In the present embodiment, the processing cycle of automatic light control 311 is six frames long.

Figure 13:
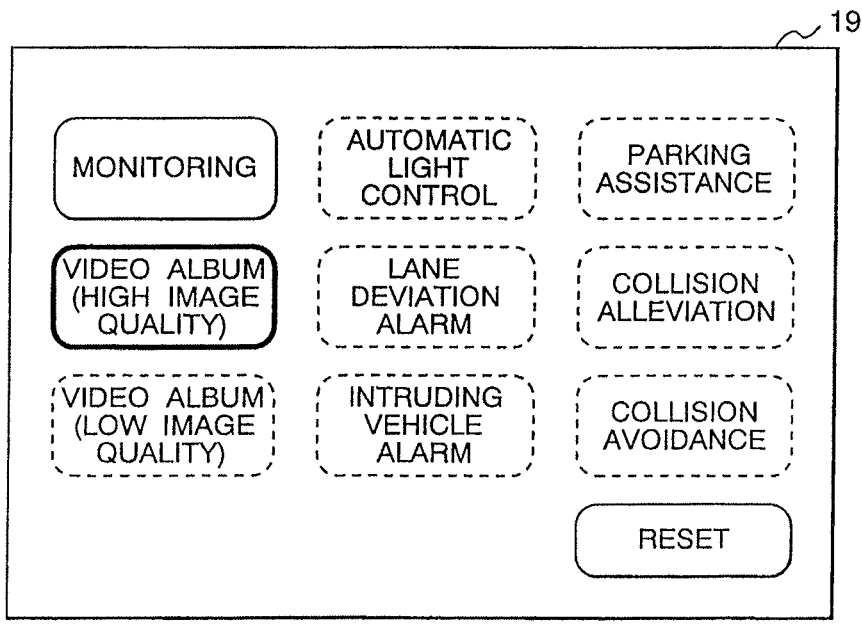
FIG. 13 is an example of screen menu display after high image quality of a video album has been selected.

After the application scheduler 14 in FIG. 13 has executed such scheduling as shown in FIG. 10B, it is possible to concurrently execute two application programs, namely, the video album 313 and automatic light control 311. At this time, processing of added automatic light control 311 is controlled to be started up in line with the processing cycle of the video album. In addition, since images are acquired synchronously with video synchronizing signals, all processing cycles and the startup timing are matched to the video synchronizing signals.

According to the above-described embodiment of the present invention, the image pickup device 6 can be shared, even among the application programs that dynamically vary camera parameters.

FIG. 11 is a diagram showing an example of grouping concurrently operable application programs. It is possible to group operable application programs beforehand and control these application programs so as to conduct scheduling for each group. Prior grouping of application programs to be operated enables a user to save the labor and time needed to select the application programs, one by one. Such grouping also enables optimum scheduling, and hence, efficient use of the image pickup device 6. Grouping is determined in consideration of matching levels of the basic image-processing functions (see FIG. 2) between application programs, and from whether the image acquisition and process scheduling operations described in FIGS. 6 and 8A to 10B can be executed. In this example, application program grouping is conducted so that groups 1 to 4 include three, two, five, and two application programs, respectively.

A user interface in an embodiment of the present invention will be described next. According to the present invention, sharing one image pickup device 6 makes it possible to select a plurality of application programs and concurrently process each application program. Accordingly, the present invention provides a user interface that enables a driver to select functions of the image-processing cameras 2, 3 or newly start the system, while driving.

Figure 12:
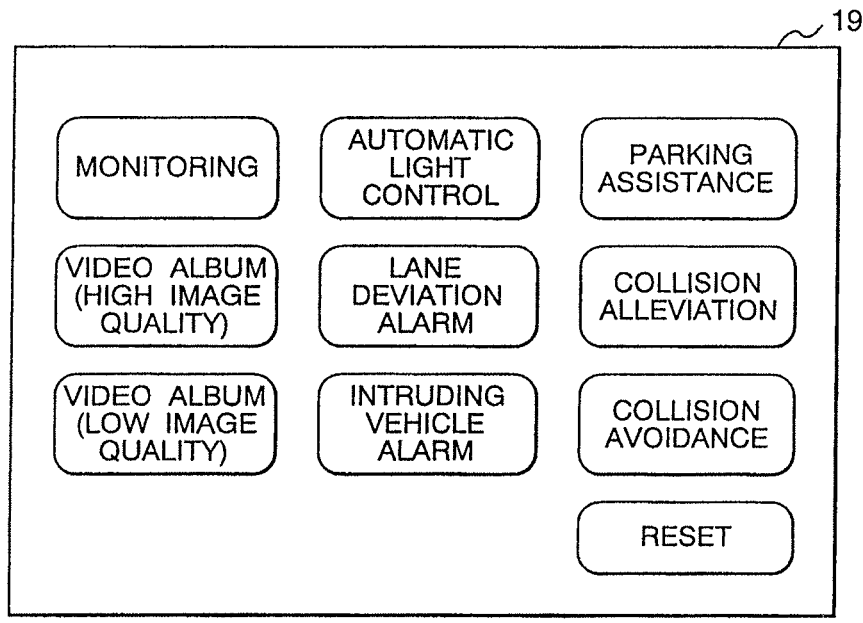
FIG. 12 is a diagram showing a navigation screen menu for selecting and switching an application program.

FIG. 12 is a diagram showing a navigation screen menu for selecting and switching an application program. The procedure required for the driver to select or switching an application program in a navigation screen menu 19 is set forth below. In FIG. 12, a large number of selectable application programs are displayed on the screen menu 19, in which state, the driver can select a desired application program by touching an application program display region of the navigation screen menu 19. An example in which high image quality of a video album is selected in the screen menu is described below. In this example, although a part of the set of application programs shown in FIG. 2 is omitted because of limited space on the paper, all the application programs are actually displayed.

FIG. 13 is an example of screen menu display after selection of high image quality of the video album. First, high-image-quality video album function 312 is selected and as shown with a thick line, "Video album (high image quality)" is displayed brightly on the screen menu 19 to indicate that this album function is in operation. When the high-image-quality video album function 312 is in operation, the kind of application program executable concurrently therewith is significantly limited, as set forth in FIG. 9A. The example shown in FIG. 13 assumes that as denoted by the concurrently operable application programs group 4 in FIG. 11, monitoring function 303 is concurrently operable. "Monitoring" is therefore displayed in a color, or at a brightness level, that indicates the monitoring function is selectable, as shown with a solid line. Display states of all other application programs are switched to a non-selectable state as denoted by a broken line.

To stop the high-image-quality video album function 312, the driver can terminate this application program by touching a RESET button or by touching "Video album (high image quality)" once again. Start/stop state information on the application program is immediately incorporated into the control of the image pickup device, and the image obtained from there will change. The change at this time is either a change in a state of the image itself due to exposure control, or a change in output timing of the image due to a change in processing cycle. Since the multiple application programs are sharing one pickup device 6, output data of the image pickup device needs to be changed when the application program in operation changes.

Figure 14A:
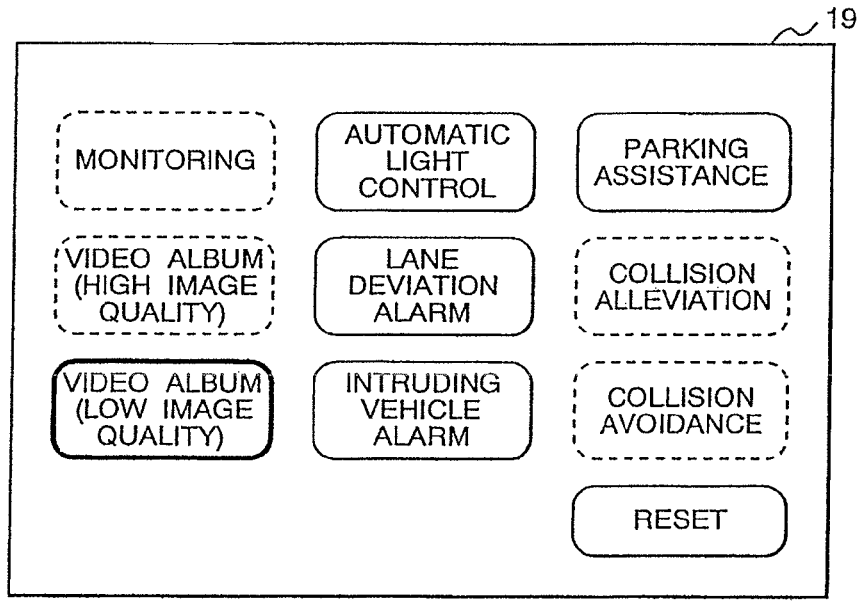
FIGS. 14A and 14B show examples of changes in a navigation screen menu state before and after addition of an application program.
Figure 14B:
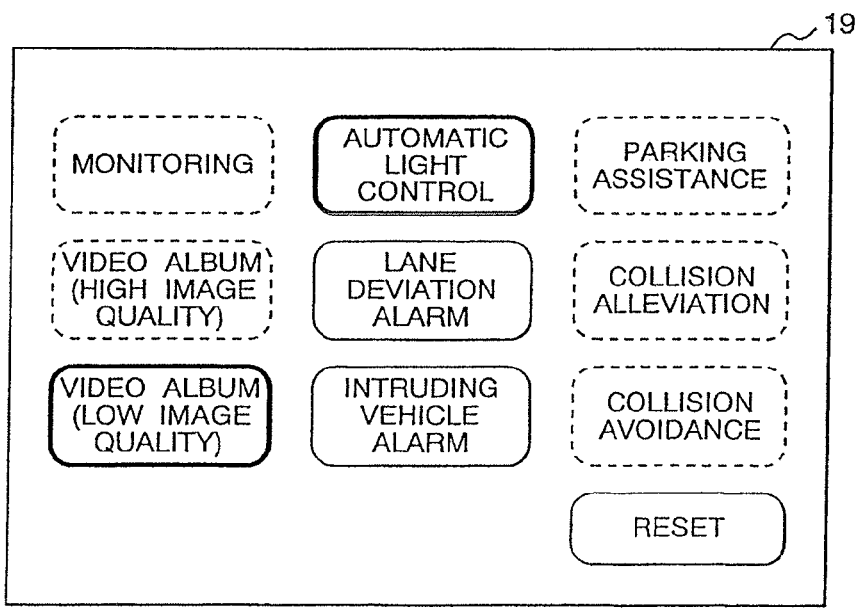

FIGS. 14A and 14B show examples of changes in navigation screen menu state before and after addition of an application program. During the operation of the low-image-quality video album function, it is possible to execute a larger number of other application programs than during the operation of the high-image-quality video album function. As denoted by the concurrently operable application programs group 4 in FIG. 11, it is possible to process automatic light control 311, intruding vehicle alarm 301, lane deviation alarm 310, and parking assistance 304, as well as low-image-quality video album function 313. The navigation screen menu 19 in FIG. 14A explicitly indicates that the low-image-quality video album function is in operation, and indicates that the above four application programs can also be started. Additional startup of automatic light control 311 by the driver is described below. In this case, assume that a display region of "Automatic light control" is touched on the screen menu of FIG. 14A.

FIG. 14B shows the screen menu displayed when automatic light control 311 is additionally started. As shown, the display region of "Automatic light control" changes to a display state to indicate that this application program is in operation, and this application program is started.

While the navigation screen menu 19 assumes application program selection and switching under an instruction from the driver, application program selection and switching are likewise possible by using information other than the driver instruction. For instance, during driving at high speed, since parking is not probable, parking assistance function 304 is not selected. In this case, it is desirable that an application program selection range be limited according to vehicle speed to thereby prohibit the selection of the parking assistance function. FIG. 14B exemplifies a state in which a display region of "Parking assistance" has been changed to a non-selectable state since the driver is driving at high speed. Even if the driver has selected parking assistance beforehand, when a planned high speed is reached, the display of "Parking assistance" is cleared to indicate that this function has been made non-selectable. During high-speed movement, application programs such as intruding vehicle alarm 301 and lane deviation alarm 310 are operable and only these operable application programs are displayed to indicate that these application programs are selectable.

It is also possible, as an example of application program switching, to operate collision alleviation and other safety functions preferentially over the lane deviation alarm and video album functions while driving in cities. Conversely, in sightseeing areas and in places of attractive scenery, it is also possible to operate the video album function preferentially and stop other functions. Furthermore, it is possible to restrict the selection of the application programs operating according to particular changes in ambient environment, and/or to switch the operation itself of the application program, on the basis of sensor information on brakes, GPS, vehicle speed, and other factors, as well as by the driver operations described above.

As described above, when the application scheduler 14 in FIG. 3 executes, additionally starts, and/or stops an application program, the driver can change the operating application program at its own discretion, from the navigation screen menu.

While the application program switching procedure in the navigation screen menu 19 is set forth in FIGS. 12 to 14B, application programs to be executed can also be selected in screen menus other than the navigation screen menu. For example, a lane-keeping driving function can likewise be selected by assigning a button to the steering wheel. In this case, when the driver presses the button, the driver will be unable to understand which application program is active. A scheduling method available in such a case would be by assigning the highest priority to the lane-keeping driving function and conducting control such that an application program not operable concurrently with the lane-keeping driving function is forcibly terminated. In such a system, not only the button, but also the various sensors mounted in/on the vehicle may perform the control function. For example, if a signal implying that an obstacle is present is input from a system-connected distance sensor that detects obstacles, an application program for obstacle avoidance can also be started up preferentially over any other application programs. In this case, if the obstacle avoidance application program is to be operated with the currently operating application program, the current application program may be left as it is. Conversely, if the two application programs cannot be operated concurrently, control can also be conducted so that the current application program is interrupted and instead the obstacle avoidance application program is immediately started to activate safety assistance functions. These functions are realized by the application scheduler 14 of FIG. 3.

Figure 15:
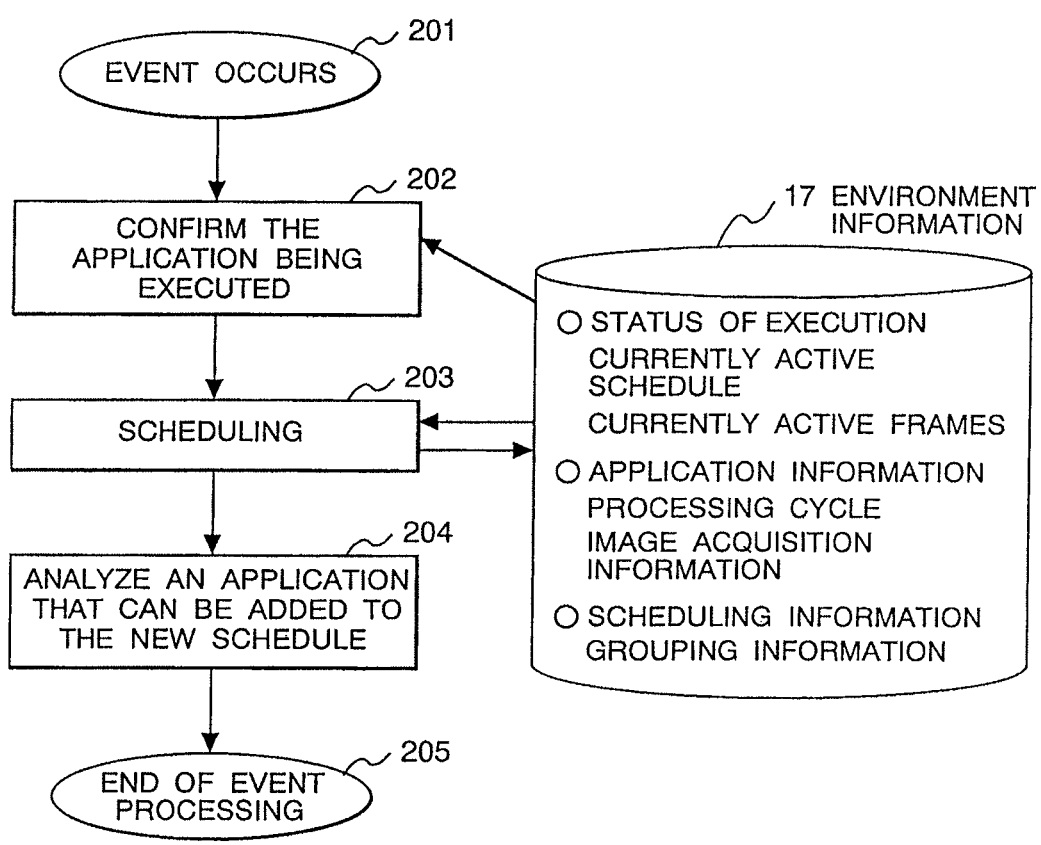
FIG. 15 is a process flow diagram of starting up an application program additionally according to an embodiment of the present invention.

FIG. 15 is a process flow diagram of starting up an application program additionally according to an embodiment of the present invention. Assume, for example, that as described in connection with FIGS. 10A-10B and 14A-14B, the driver additionally starts automatic light control 311 on the navigation screen menu 19 during the operation of the low-image-quality video album 313. When "Automatic light control" is selected by the driver using a touchpanel, control progresses to step 201, in which an event of adding an application program is accepted from the navigation function and this process is started by an interruption process. The acceptance of the event is followed by step 202, in which the program acquires information on the currently active application program and on the application program to be added. Information on these application programs is already stored within the environment information database 17 shown in FIG. 3, and the information is image acquisition information that includes the schedule being executed, the current frame, the processing cycles of each application program, and camera parameters. The above application programs information also includes, for example, such grouping information as described in FIG. 11, the grouping information being examination results on which application program can be executed concurrently. In the scheduling process of step 203, it is confirmed whether the selected automatic light control function belongs to the same group as that of the currently operating low-image-quality video album function. Even without the grouping information, whether the selected application program is executable can be confirmed by referring to the application programs information. On the basis of the number of processing cycles, the number of images to be acquired, and information of a necessary image-processing function, whether the selected application program can be executed is judged from whether such allocation of a necessary process to a professing cycle as described in FIGS. 6 to 10B is possible. After classification of an executable application program and an inexecutable one, classification result information is incorporated into the application programs information. If the application program can be executed, the schedule is updated using the application programs information and scheduling information contained in the environment information 17. More specifically, the schedule is updated so that the application program whose additional startup has been requested repeats acquiring image data from one image pickup device without overlapping in terms of time with respect to the currently operating application program. In step 204, an application program that can be added is analyzed again according to the new schedule created by updating, and analytical results are notified to the driver or preparations for accepting a next application program-adding event are conducted. After these, processing ends with step 205.

This process of adding and starting an application program is executed by an interruption process after the occurrence of an event has been detected. Therefore, it is unknown in which step of the flow described in FIG. 7 the interruption process is conducted. In the present embodiment, the schedule is updated in step 71 of FIG. 7 to ensure consistency of the information being processed.

The image-processing camera system according to the present embodiment is summarized below. A step (202) in which to select a plurality of concurrently executable application programs is conducted first. This is followed by a scheduling step (203) in which to determine the image data acquisition timing and intervals at which the plural executable application programs repeat acquiring image data from one image pickup device without overlapping in terms of time. This scheduling step (203) includes the step of determining the timing that involves the processes using the image data which has been acquired by each application program. The step of reading out the number of image data frames and necessary acquisition rates in each of the plural application programs, from a storage element (17) into which these values have been stored, is also included. In addition, a step is included that determines, from the above-read number of image data frames and acquisition rates, the image acquisition timing and intervals at which the plural executable application programs repeat acquiring image data from one image pickup device.

Figure 16:
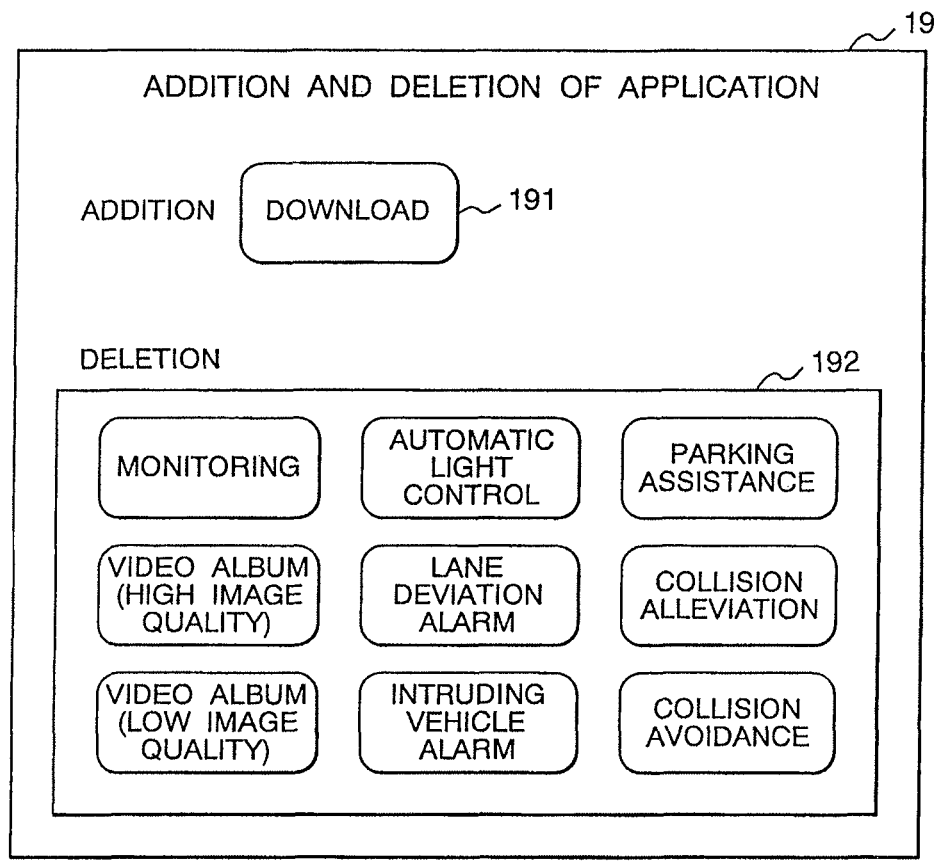
FIG. 16 is diagram showing an example of a screen menu for adding a new application program and deleting an existing application program.

FIG. 16 is diagram showing an example of a screen menu for adding a new application program and deleting an existing application program. Application programs can be added to the menu by defining the processing cycle, the kind of image-processing function, an image to be used, throughput, and other information required for operation. These application programs, as with conventional application programs, can be selected and/or deleted from the screen menu. A touchpanel 191 for adding a new application program by performing a download operation, and a touch-panel 192 for deleting an existing application program are displayed in FIG. 16.

Figure 17:
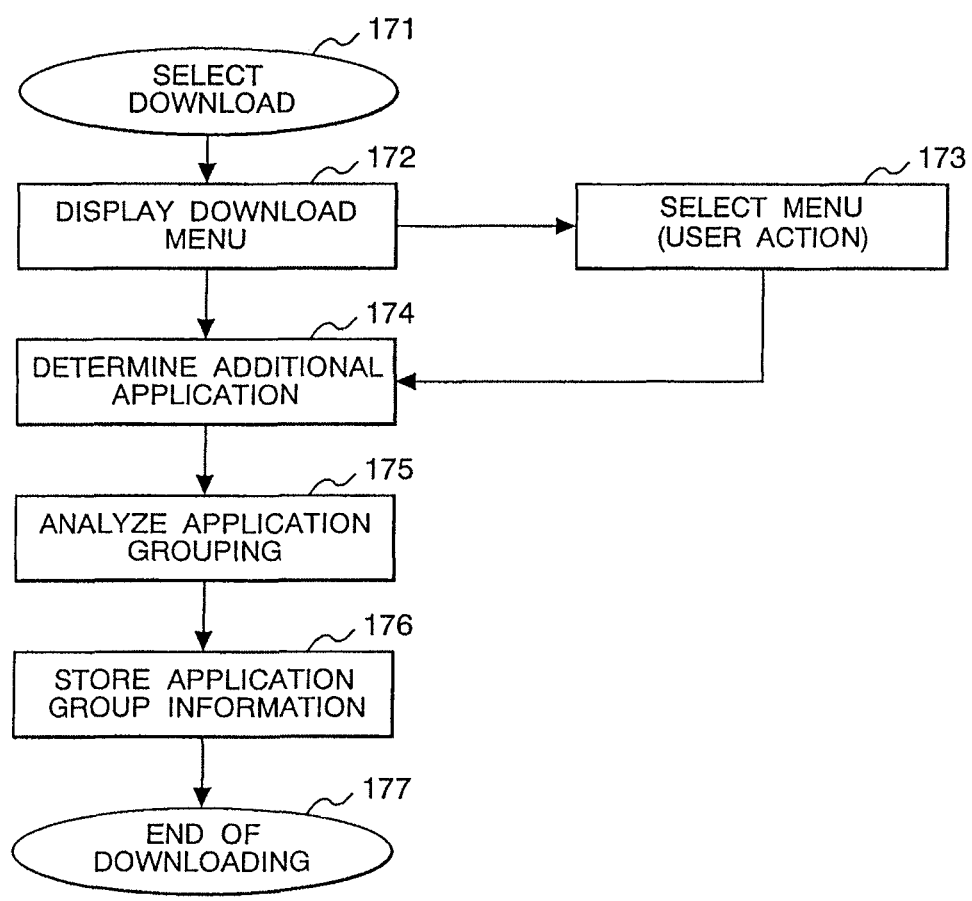
FIG. 17 is a download process flow diagram of a new application program according to an embodiment of the present invention.

FIG. 17 is a download process flow diagram of a new application program. The download operation using the screen menu of FIG. 16 is described below. A new application program is acquired from the Internet or recording media such as a Compact Flash memory card. When a user selects a new application program from the download, this process is started from step 171. In step 172, downloadable application programs are presented as a menu to the user. In step 173, the user selects a necessary new application program from the menu. The selection of the new application program to be added in step 174, based on the above results, is followed by analysis of concurrently executable application programs in step 175. A combination of concurrently executable application programs is, as described above, judged from the number of processing cycles, the number of image frames to be acquired, the kind of image-processing function to be used, and other factors. The existing groupings shown in FIG. 11 are updated according to judgment results. In step 176, after combinations in all groups have been confirmed, information is stored as application programs information, and then in step 177, the download process is completed.

Figure 18:
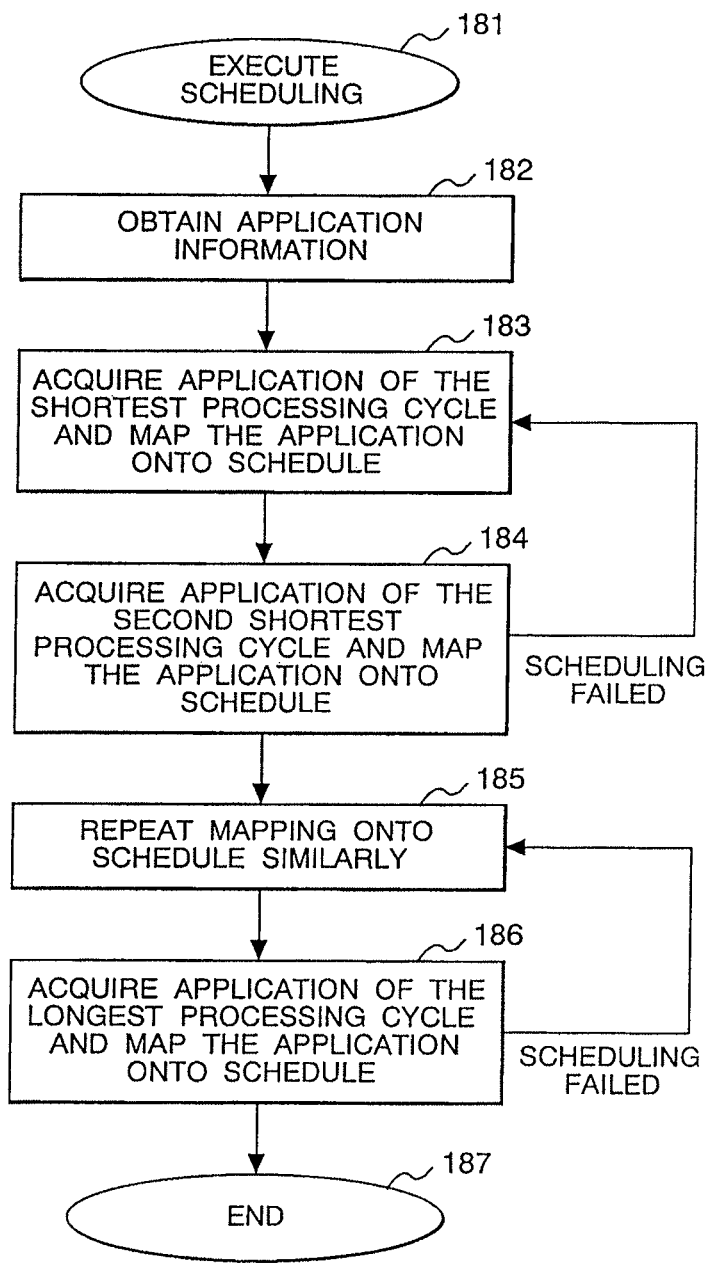
FIG. 18 is a process flow diagram of operational scheduling of multiple application programs inclusive of a new application program.

FIG. 18 is a process flow diagram of operational scheduling of multiple application programs inclusive of a new application program. This scheduling process is conducted during the scheduling in step 203 of FIG. 15. First, the scheduling process is started in step 181, and then, information on the application program being executed and on the application program added is acquired in step 182. In step 183, the application program having the shortest processing cycle is mapped onto the schedule. At this time, the application program is mapped with the largest possible margins so that other application programs can be operated. For example, no such mapping is not conducted that an application program whose processing can be completed within six frames is processed using three frames. After the application program having the shortest processing cycle has been mapped, the application program having a next shorter processing cycle is mapped in step 184. If the mapping in this step fails, i.e., if the image pickup device 6 cannot be used or if a sufficient time for software processing cannot be reserved, control returns to the previous step 183, namely, the application-scheduling process. After this, usage timing of the image pickup device 6 or software-processing timing is changed and the application program having the second shortest processing cycle is mapped once again. If the mapping succeeds, control advances to step 185 and application programs are serially mapped onto the schedule. It is confirmed in step 186 that the application program having the longest processing cycle can be mapped onto the schedule. If an application program not capable of being mapped onto the schedule appears during the scheduling process, the application program that has been requested to be added is judged not to be a concurrently executable application program. This is then notified to the user, and additional startup is aborted.

The above embodiment includes the plurality of application programs (151 to 15N) which have each been set to have a different function, by using both the image pickup device (6) that acquires image data, and the image data obtained from this image pickup device. The above embodiment also includes an image pickup device controller (13) that controls the image pickup device in accordance with image data acquisition requests associated with plural application programs. In addition, the above embodiment assumes an image-processing camera system having a controller (14) which concurrently executes plural application programs after image data acquisition from one image pickup device thereinto. This system also has an element (17) that stores the image data volumes and image data acquisition rates necessary in plural application programs. In addition, the system has an element (14) that selects a plurality of concurrently executable application programs on the basis of the stored image data volumes and image data acquisition rates. Furthermore, the system has an image acquisition scheduler (14) that determines the image acquisition timing and intervals at which the plural executable application programs repeat acquiring image data from one image pickup device. This scheduler (14) is adapted to determine timing inclusive of the processes that use the image data which has been acquired into each application program.

Moreover, the system has an application programs group storage element (17) that stores a combination of the plural application programs concurrently executed using the image data that has been acquired from one image pickup device. During storage of these application programs, the above-mentioned selection element reads out data on each of the concurrently executable application programs, from the application programs group storage element 17.

Moreover, the system has a plurality of basic image-processing function blocks (16A to 16M) that control the image pickup device in order to execute the plural application programs. In addition, the system includes an element which, on the basis of functional matching levels of the basic image-processing functions required, determines the plural application programs to be concurrently executed using the image data that has been acquired from one image pickup device.

The foregoing element (14) that selects the plurality of concurrently executable application programs on the basis of the stored image data volumes and image data acquisition rates is constructed so that during execution of an application program, other executable application programs are selected on the basis of the fact that these latter application programs belong to the same application programs group as that of the application program being executed. The above also aids in the selection of other executable application programs, based on the functional matching levels of the necessary basic image-processing functions with respect to the application program being executed. Additionally, the above is adapted to select each of the other executable application programs, depending on whether the image data that the particular executable application program requires can be acquired from the image pickup device during an interval within a period of image data acquisition from the image pickup device by the application program being executed.

Next, a man-machine interface includes an element (19) that displays executable application programs, and an operations element for the user to specify startup of the displayed executable application programs. This interface also has an element that displays the application program being executed and additionally executable application programs, and an operations element for the user to specify startup of the additionally executable application programs and shutdown of the application program being executed. The interface additionally has a control element that conducts the startup and shutdown of the application programs, based on the instructions entered using the operations element.

In addition, there are provided an executable-application programs selection element that selects an additionally executable application program according to particular changes in ambient environment, and an element that displays the executable application program which has been selected by the selection element.

Furthermore, an operations element is provided that requests adding a new application program using the download function.

These features enable highly reliable, efficient sharing of one image pickup device among a plurality of application programs. Also, the user can select executable application programs, and the user-selected application programs can be executed immediately. Additionally, an application program to be preferentially executed can be selected and executed according to a particular status of the system.

While the present invention has heretofore been described in connection with the embodiments applied to the image-processing camera system mounted in an automobile, the present invention can be applied to various image-processing camera systems. The present invention is also applicable to an intruder surveillance camera system, for example. The number of cameras to be used can be reduced by applying the present invention when sharable image-processing functions exist, and sharing a camera, with high reliability, for each function required for an application program, rather than by installing multiple cameras to realize a specific function.

INDUSTRIAL APPLICABILITY

According to the present invention, it is possible to provide an image-processing camera system capable of sharing one image pickup device, with high reliability, among multiple application programs.

Also, according to the embodiments of the present invention, it is possible to provide a very-easy-to-use image-processing camera system capable of displaying explicitly a plurality of executable application programs to a user and enabling the user to select desired application programs without hesitation.

What is claimed is:
1. An image-processing camera, comprising:
an image pickup device mounted on a vehicle, said image pickup device having a lens, an image pickup element, and an optical system controller that controls said lens and said image pickup element;

a memory storage that stores a plurality of applications which perform image processing for running of the vehicle using an image acquired by said image pickup device based on one or more different camera parameters; and a controller that:

acquires the image used by the plurality of applications from said image pickup device used in common, has a schedule for acquiring repeatedly the image data used by the plurality of applications in a state which does not overlap in time based on each rate set up for every application, and executing the plurality of applications as a function of time; and sets up the optical system controller based on predetermined camera parameters, according to said schedule;

wherein the selection of the plurality of application programs operating is restricted, and/or the operation itself of the application program is switched, based on vehicle speed detected.

2. The image-processing camera according to claim 1, wherein the plurality of applications contain a parking assistance application and a lane deviation alarm application at least, and when the vehicle speed is lower than a predetermined speed, said parking assistance application is chosen.

3. The image-processing camera according to claim 1, wherein the plurality of applications contain a parking assistance application and a lane deviation alarm application at least, and when the vehicle speed is higher than the predetermined speed, said parking assistance application is not chosen.

4. The image-processing camera according to claim 1, wherein camera parameters are set for each application of the plurality of applications.

5. The image-processing camera according to claim 1, wherein the image pickup device is mounted on the vehicle and acquires image data in the direction of the front of the vehicle or the direction of back of the vehicle.

* * * * *